W. H. STROUSE.
AUTOMOBILE TIRE.
APPLICATION FILED SEPT. 17, 1915.
1,188,701. Patented June 27, 1916.
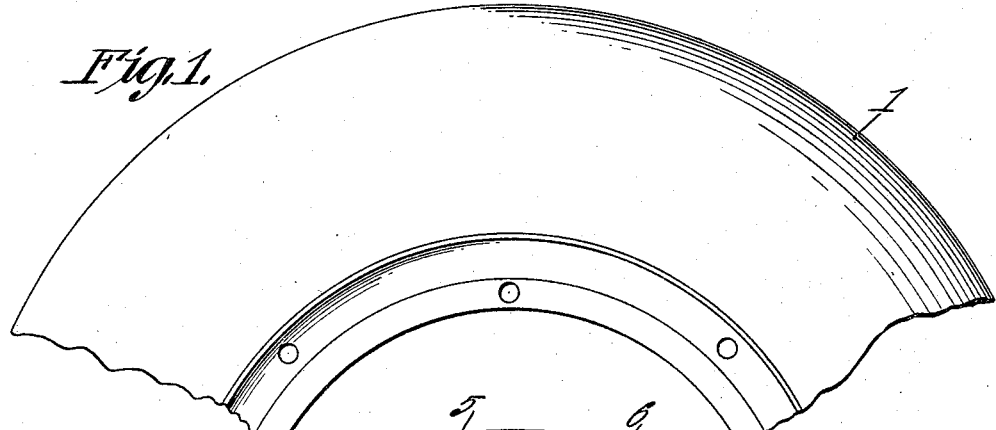
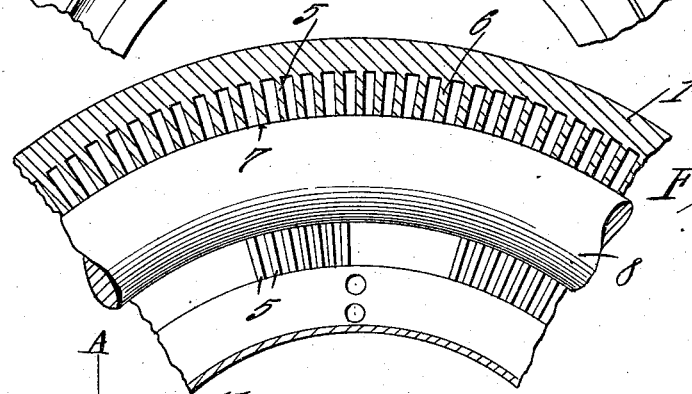
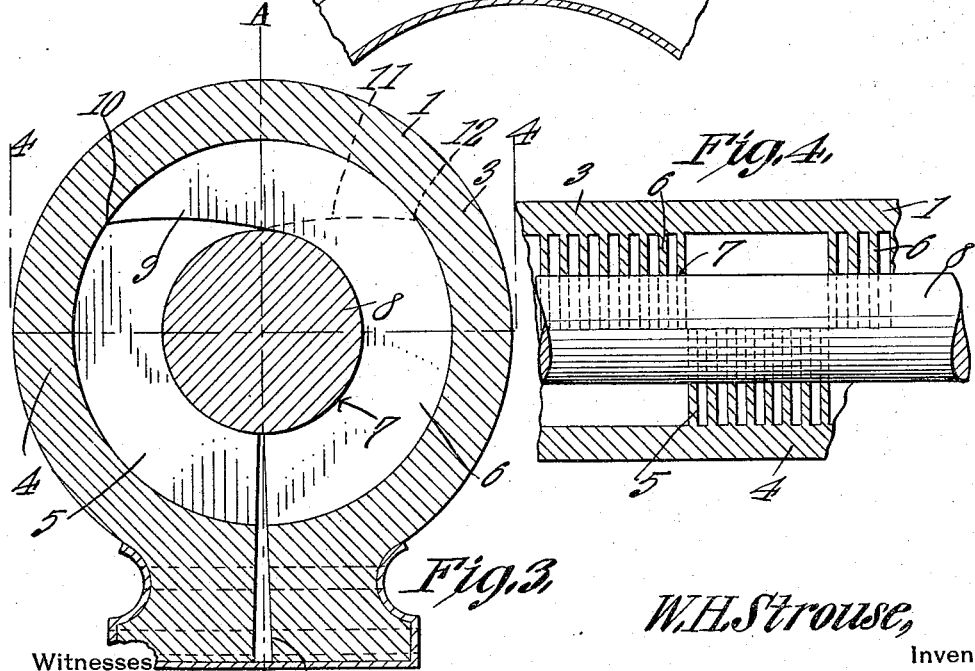
W. H. Strouse, Inventor

UNITED STATES PATENT OFFICE.

WILLIAM H. STROUSE, OF OSKALOOSA, IOWA.

AUTOMOBILE-TIRE.

1,188,701.　　　　　Specification of Letters Patent.　　Patented June 27, 1916.

Application filed September 17, 1915. Serial No. 51,234.

*To all whom it may concern:*

Be it known that I, WILLIAM H. STROUSE, a citizen of the United States, residing at Oskaloosa, in the county of Mahaska and State of Iowa, have invented a new and useful Automobile-Tire, of which the following is a specification.

The device forming the subject matter of this application is an automobile tire and one object of the invention is to provide, by a novel construction, a tire which will be adequately reinforced at its tread, without impairing the resiliency of the tire.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in side elevation, a portion of a tire constructed in accordance with the present invention; Fig. 2 is a section taken along the median plane of the tire; Fig. 3 is a transverse section; and Fig. 4 is a section taken on the line 4—4 of Fig. 3.

In the drawings, the numeral 1 indicates a casing made of rubber or a rubber compound, the casing 1 being divided along its inner curve as shown at 2 to define sides 3 and 4. The side 4 is provided with spaced groups of inwardly projecting, transverse ribs 5, and the side 3 is provided with spaced groups of inwardly projecting ribs 6, alternating with the groups of ribs 5, the groups of ribs coöperating to define a central chamber 7 in which is held, by engagement with the ribs, a core 8 which may be fashioned out of fiber, wood, a rubber compound, or any other suitable substance. As indicated at 9, the ribs 6 on the side 3 are extended beyond the median plane A—B of the casing 1 onto the side 4 and terminate as shown at 10 on the side 4, adjacent the median plane A—B of the casing. The ribs 5 of the side 4 of the casing are extended as shown at 11 beyond the median plane A—B of the casing and terminate as shown at 12, on the side 3 of the casing adjacent the median plane A—B of the casing. The construction, therefore, is such that along the tread of the tire considered circumferentially, there is a continuous series of transverse ribs, whereas, at the sides of the tire, the ribs lie in alternating groups. Owing to this construction, the weight is carried adequately into the core 8 at the tread, but at the sides of the tire, an additional and desirable resiliency results.

Having thus described the invention, what is claimed is:—

1. A tire casing provided in its interior and upon its opposite sides with alternating, inwardly projecting, transverse ribs, the ribs on the respective sides coöperating to define a chamber, the ribs on each side being extended beyond the median plane of the casing onto the other side at the tread of the casing and terminating on said other side adjacent the median plane of the casing; and a core in the chamber.

2. A tire casing provided in its interior and upon its opposite sides with alternating groups of inwardly projecting transverse ribs, the groups of ribs coöperating to define a chamber, the ribs of the groups on each side being extended beyond the median plane of the casing onto the other side and terminating on said other side adjacent the median plane of the casing; and a core in the chamber.

3. A tire casing provided in its interior and upon its opposite sides with alternating groups of inwardly projecting ribs, the ribs of the respective groups being overlapped, circumferentially of the casing, at the tread of the casing, the ribs of the groups coöperating to define a chamber; and a core in the chamber.

In testimony that I claim the foregoing as my own, I have hereto affixed my signature in the presence of two witnesses.

WILLIAM H. STROUSE.

Witnesses:
R. M. BOYER,
WALKER M. LEWIS.

Copies of this patent may be obtained for five cents each, by addressing the "Commissioner of Patents, Washington, D. C."